United States Patent [19]
Eckhardt

[11] 3,803,679
[45] Apr. 16, 1974

[54] CENTER MAINTAINING ROTARY FEEDING SYSTEM

[76] Inventor: Roger S. Eckhardt, 255 Lockwood St., Saginaw, Mich. 48602

[22] Filed: May 27, 1971

[21] Appl. No.: 147,447

[52] U.S. Cl.......................... 29/27 R, 82/1.2, 82/18
[51] Int. Cl............................................. B23b 7/14
[58] Field of Search........................... 82/1, 1.2, 18

[56] References Cited
UNITED STATES PATENTS

| | | | |
|---|---|---|---|
| 3,442,165 | 5/1969 | Billeter | 82/18 |
| 2,713,282 | 7/1955 | Burgsmuller | 82/1 |
| 2,029,385 | 2/1936 | Perkins | 82/1 |
| 2,867,139 | 1/1959 | Caldwell | 82/1.2 |
| 2,871,731 | 2/1959 | Stuber | 82/1.2 |

Primary Examiner—Leonidas Vlachos

[57] ABSTRACT

Apparatus for machining a workpiece including a workpiece support member, a rotatable carrier supporting a rotary cutting tool for movement therewith in an annular path of travel toward and away from the workpiece, and for rotary movement relative thereto between a remote inoperative position and an operative position in cutting engagement with a workpiece on a support member to cut an arcuate surface concentric about the axis of the workpiece as the tool moves in the annular path.

25 Claims, 7 Drawing Figures

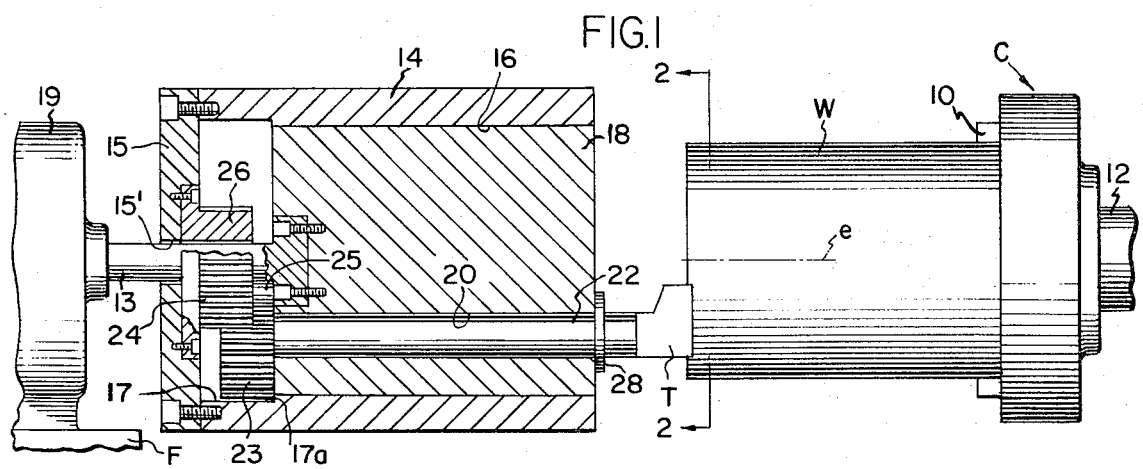
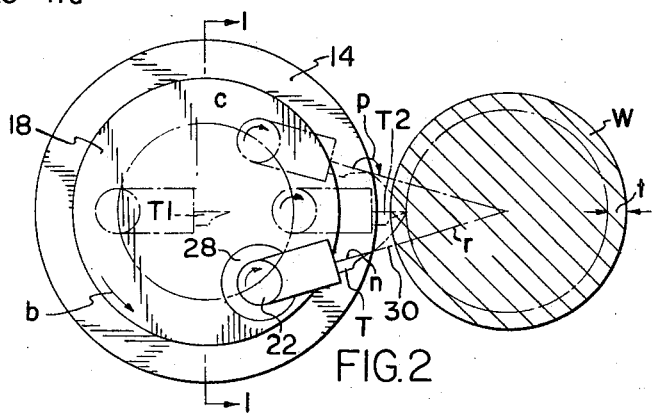
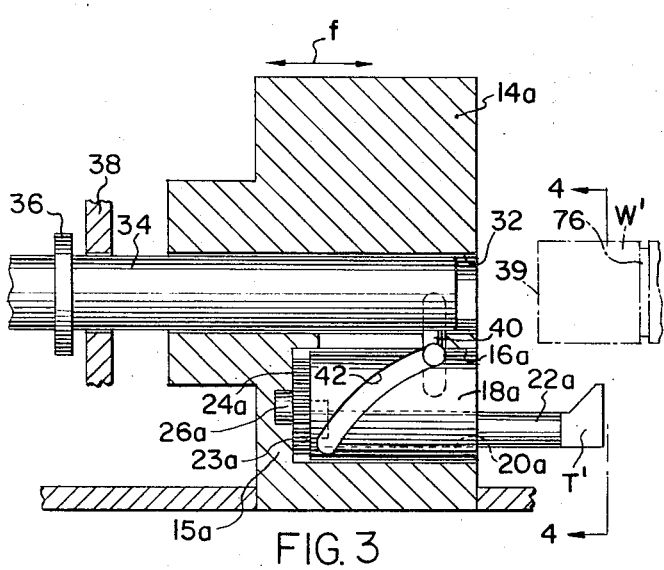
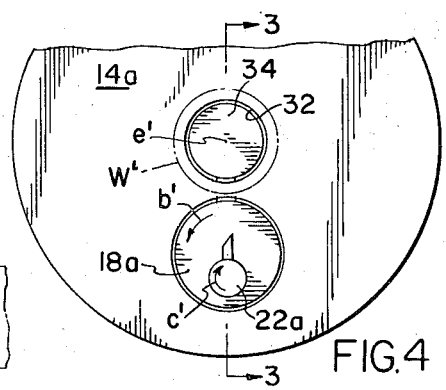
INVENTOR
ROGER S. ECKHARDT
BY
Learman & McCulloch
ATTORNEYS

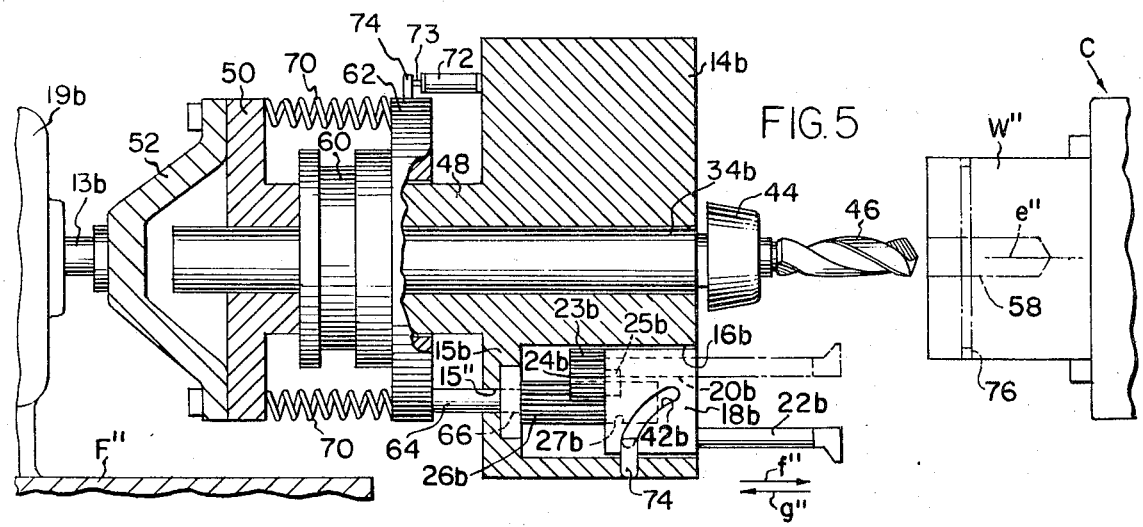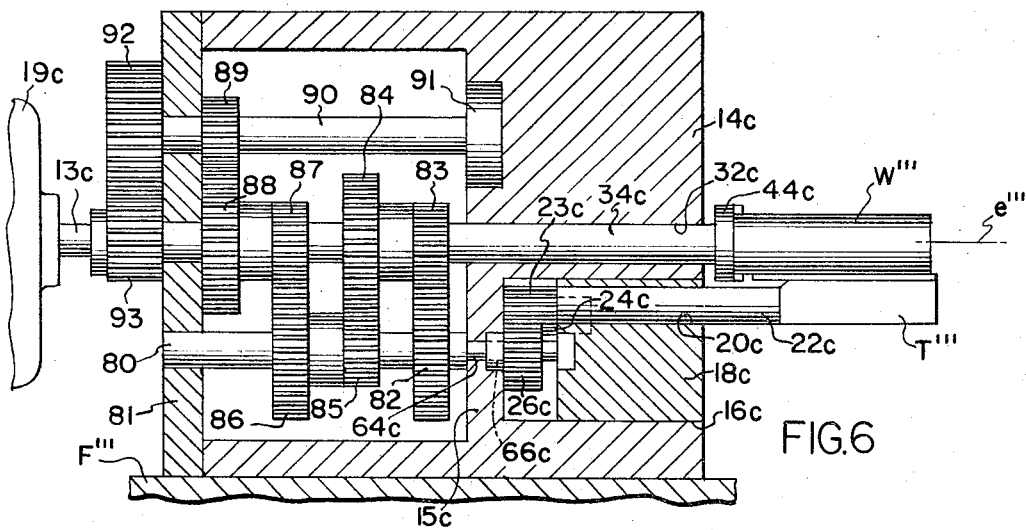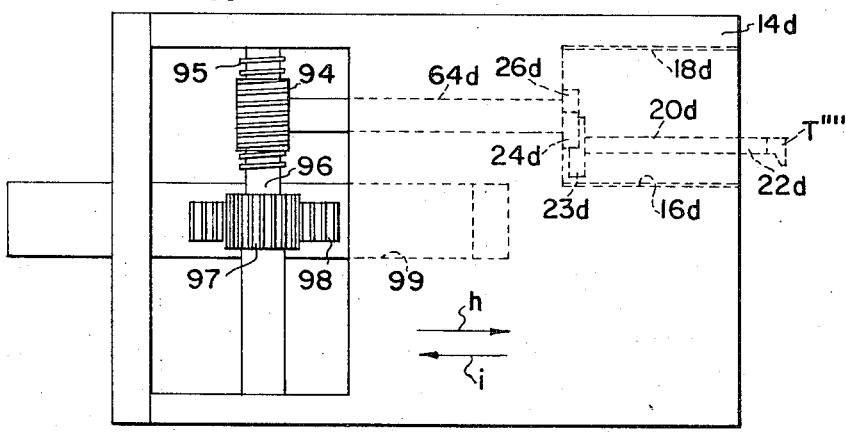

CENTER MAINTAINING ROTARY FEEDING SYSTEM

FIELD OF THE INVENTION

This invention relates to machining apparatus and, more particularly, to apparatus for moving a cutting tool in an annular path of travel while simultaneously rotating the tool about its axis to cut an arcuate surface on a workpiece.

BACKGROUND OF THE INVENTION

Lathe machines for performing work on bars of stock have been provided in the past and basically, have all utilized dove-tail slides, or ways, and gibs for advancing a tool to a workpiece in a recti-linear path of travel toward and away from the workpiece. Frequently such machines employ multiple, orbitally movable work supporting spindles and a plurality of tool mounting slides. Basically, there are two types of slides for carrying tool holders - the end slide and the side, or cross, slide. The end slide is disposed axially opposite the orbital axis of the spindles and has a mounting surface for a tool holder which is positioned axially in line with each spindle position. There are as many mounting surfaces on it as there are spindles on the machine. The end slide is particularly adapted to hold tools that will cut from the end of the workpiece as the slide is fed axially toward the spindles at the desired rate of speed.

The side, or cross, slides are mounted radially around the spindles and hold tools that will cut from the side of the workpiece. Frequently, there are more side cutting operations to be performed on a workpiece to be machined than there are side slides on a given machine. Occasionally, space restriction, the number of working parts, and economic considerations also limit the number of side slides available. In these instances, the workpiece must be unchucked from the machine and chucked to another machine which will accomplish the remaining cutting operations. Frequently, although the cross slides are all filled with tooling, open tooling positions remain in the end slide. Accordingly, it is an object of the present invention to provide machine tool apparatus which can be mounted on an end slide to perform an operation normally accomplished by a tool mounted on a cross slide.

It is another object of the present invention to provide machining apparatus which can be mounted on a cross slide and operated to cut a workpiece without moving the workpiece and cross slide toward or away from each other.

The cutting position of a tool relative to the centerline of the workpiece is important. For the most efficient operation, a tool cuts on the centerline of the work as it moves toward the work. The tool may, however, be set slightly above or below the centerline of a work for certain machining conditions. If the tool is set below the centerline of the workpiece an excessive distance, shatter and tool breakage will result. If on the other hand, the tool is set above the centerline of the work an excessive distance, excessive tool wear or breakage will result and, in addition, the surfaces of the workpieces will have a rough finish. Accordingly, it is an object of the present invention to provide a rotary feeding system for moving cutting apparatus in an annular path of travel while maintaining the circumferential position of the cutting apparatus relative to the cutting radius, or rake angle, substantially constant.

In the prior art machines employing end and cross slides which move in recti-linear paths of travel toward and away from the axes of the workpieces, stops are conventionally employed to interrupt the forward movement of the cutting tools. The surfaces, which repeatedly engage the stops, wear with continued use, so that the tools are not always precisely positioned in the same location for successive cuttings. This, of course, results in inaccurately cut workpieces unless the machine is adjusted after only a few workpieces are cut. Accordingly, it is still another object of the present invention to provide rotary machining apparatus which will machine workpieces accurately for a sustained period of time without the necessity of resetting or readjusting the machine.

Other objects and advantages of the present invention will become apparent to those of ordinary skill in the art as the description thereof proceeds.

SUMMARY OF THE INVENTION

Machining apparatus comprising means for supporting a workpiece at a work station, swingable cutting tool means including a cutting edge for cutting said workpiece at said work station, means mounting said support means and said swingable cutting tool means for relative movement including means mounting at least one of said support means and said cutting tool means for rotation about the axis of the workpiece, and mounting said cutting tool for movement in an endless path, means for rotating one of the cutting tool means and said support means about the axis of the workpiece while moving the cutting tool means in the endless path, and means for swinging the cutting tool means about its own axis, as it moves in said endless path, about an axis spaced from the workpiece axis, in such a path that the relative circumferential positions of the cutting edge and a radial line intersecting the workpiece axis and any given point on the cutting edge remains the same as the cutting tool means cuts said workpiece.

The present invention may be more readily described by reference to the accompanying drawings, in which:

FIG. 1 is a sectional side view of apparatus constructed according to the present invention, taken along the line 1—1 of FIG. 2;

FIG. 2 is a sectional end elevational view, taken along the line 2—2 of FIG. 1;

FIG. 3 is a sectional side view of apparatus constructed according to a modified embodiment of the invention, taken along the line 3—3 of FIG. 4;

FIG. 4 is an end elevation view of the apparatus illustrated in FIG. 3 and taken along the line 4—4 of FIG. 3;

FIG. 5 is a sectional side view of apparatus constructed according to another embodiment of the invention;

FIG. 6 is a sectional side view illustrating apparatus constructed according to a still further embodiment of the present invention; and FIG. 7 is a top plan view illustrating apparatus constructed according to yet another embodiment of the present invention.

Apparatus constructed according to the present invention is particularly adapted for use with a collet or chuck, generally designated C, including chucking jaws 10 which circumferentially grip a bar of stock, or workpiece W. The collet or chuck C is supported for rotation on the end of a rotatable spindle 12 which is rotated about its axis by a suitable source of power, such as an electric motor (not shown). Apparatus constructed according to the present invention includes a frame F which is supported forwardly of the workpiece W, and if desired, can be supported on a cross slide of a conventional transfer machine or a multiple spindle bar machine, such as that manufactured by National ACME Company of Cleveland, Ohio, as Model No. RB-6. Apparatus constructed according to the present invention includes a cylindrical support member 14 fixed to the frame F and having an end closure wall 15, bolted or otherwise suitably secured to one end thereof, and a cylindrical bore 16 therein for snugly receiving a rotary carrier drum 18. The carrier drum 18 is driven about its axis by means of a drive shaft 13 passing through a bore 15' in the end wall 15 and fixed to the output shaft of an electric motor 19.

An axially extending, eccentric passage 20 is provided in the carrier drum 18 and receives a rotatable stem or spindle 22 therein mounting a cutting tool, generally designated T, on the free end thereof. A gear 23 is fixed to the opposite end of the spindle 22 and is in driving engagement with an idler gear 24 which is fixed to a stub shaft 25 that is journaled in one end wall of the carrier drum 18. The idler gear 24 is meshed with a gear 26 which is fixed to the end closure wall 15 and is aligned with the axis of the drum carrier 18. When the drive shaft 13 is rotated to revolve the carrier drum 18 in a first direction, the tool mounting stem 22 is rotated therewith in an annular path of travel and the gears 23 and 24 "walk around" the fixed gear 26 so as to rotate the stem 22 about its own axis in an opposite direction.

The relative sizes of the gears and the number of gear teeth on each gear are so chosen that the rake angle, or the relative circumferential position of the cutting surface $n$ of the tool T and the cutting radius $r$ on which to tool is cutting, is always the same.

Axial movement of the drum 18 is prevented by a snap ring 28 fixed on the stem 22 adjacent the opposite end face of carrier drum 18 and the gear 23 which rides against the shoulder 17a of an annular groove 17 cut in one end of the cylinder wall 16.

THE OPERATION

In operation, the workpiece W is chucked in the collet or chuck C and is rotated about the workpiece axis $e$ at a high velocity. When it is desired to turn or otherwise cut the outside diameter portion of the workpiece W, the motor 19 on the stationary cross slide is operated to drive the shaft 13 and rotate the drum carrier 18, in the direction of the arrow $b$ (FIG. 2), relative to the stationary cylindrical support member 14 so that the tool T is moved from the position illustrated at $T_1$, in FIG. 2, to the position illustrated at $T_2$ (FIG. 2). While the carrier 18 is moving counterclockwisely, in the direction of the arrow $b$, the spindle 22 is rotating clockwisely in the opposite direction, represented by the arrow $c$ (FIG. 2), so that the rake angle p or the radial orientation of the tool T relative to the cutting radius $r$, itersecting any given point on the tool T, remains constant as the tool T moves into cutting engagement along a path, designated 30, to reduce the radius of the workpiece W by a distance $t$. By maintaining the rake angle p between the cutting edge $n$ of the tool T and the cutting radius $r$, intersecting any given point on the tool edge, substantially constant throughout the cutting movement, the tool T will be maintained in optimum cutting relation with the surface of the tool of the workpiece.

It should be understood that after the tool T has cut the workpiece W to a depth $t$ and is moving away from the workpiece, the workpiece W can be indexed axially and another cutting operation can be accomplished on the same workpiece, or, another workpiece can be substituted and cut when the tool T returns to the cutting position, illustrated at $T_2$ in FIG. 2. After the cutting has been completed, the speed of the motor 19 can be greatly accelerated so that the time required to cover the noncutting portion of the annular path is minimized.

THE ALTERNATE EMBODIMENTS

Referring now more particularly to the embodiment illustrated in FIGS. 3 and 4, a cylindrical support member, generally designated 14a, is provided and may be mounted on the end tool slide of the Acme-Gridley multiple spindle bar machine, mentioned above, for axial movement, in the directions represented by the arrow $f$, toward and away from a workpiece W' which is mounted for rotation about the workpiece axis $e'$. The cylindrical support 14a is provided with a bore 16a which receives a rotatable drum carrier member 18a rotatable about its axis.

The drum carrier 18a includes an axially extending eccentric passage or bore 20a receiving a stem 22a which mounts a cutting tool T'. Fixed to the opposite end of the stem 22a is a gear 23a in intermeshing relation with an idler gear 24a which is fixed to a spindle journaled in the end wall of the drum carrier 18 and is also in intermeshing relation with a gear 26a fixed to the end wall 15a of the member 14a. The relationship and operation of the gears 23a and 24a and 26a is identical to that of the gears 23, 24 and 26. As the drum carrier member 18a is rotated in the direction represented by the arrow $b'$, the stem 22a and tool T move in an orbited path. The idler gear 24a which reacts with the fixed gear 26a and the stem gear 23a, drives the gear 23a and rotates the member 22a about its own axis.

A central bore or passage 32 is provided in the member 14a and receives a bar 34 having a collar 36 fixed thereto for engaging a stationary stop 38 after the bar 34 has moved axially toward the workpiece W' a predetermined distance. Fixed to the opposite end of the bar 34 is a pin 40 received in an arcuate camming track 42 cut in the circumferential wall of the rotary drum carrier 18a. The carrier support 14a is axially moved in reciprocal to-and-fro path, represented by the arrow $f$ (FIG. 2), to move the tool T' axially toward and away from the rotating workpiece W'.

The apparatus illustrated in FIGS. 3 and 4 is particularly adapted for use in cutting a notch 76 in the outer circumferential surface of the workpiece W' axially inwardly of the workpiece end face 39. The collar 36 is so positioned relative to the wall 38 that, after the tool T' has passed axially inwardly of the end face 39 of the workpiece W', the collar 36 engages the stop 38 to interrupt the axial movement of the bar 34. When the movement of the bar 34 is interrupted, the member 14a and carrier 18a continue to move axially and the pin 40 reacts with the cam track 42 and rotates the carrier 18a counterclockwisely, in the direction represented by the arrow b'. As the carrier 18a rotates about its axis, the tool T' is driven, through gears 26a, 24a, and 23a, clockwisely, in the direction represented by the arrow c', so that the radial orientation of the tool T' relative to the workpiece axis e' remains substantially constant throughout the cutting action.

Referring now more particularly to the embodiment illustrated in FIG. 5, a workpiece W" is chucked by a stationary collet or chuck C. The frame F" may suitably comprise an end tool slide movable axially toward and away from the workpiece W" in the directions represented by the arrows f" and g". Mounted on the end tool slide F" for movement therewith is the motor 19b for driving a shaft 34b on which a carrier support member 14b is fixed. The carrier support 14b member includes an axially extending, eccentric passage 16b receiving a rotary drum carrier member 18b. A collet 44 is mounted at the outer end of the spindle 34b for clamping a drill 46 therein. The carrier 14b includes an axially rearwardly extending reduced diameter portion 48 having an end flange 50 bolted to a drive member 52 fixed on the output shaft 13b of a suitable power source such as an electric motor 19b that is supported on the frame F". As the motor 19b is driven to rotate the carrier support member 14b about the workpiece axis e" and the carrier support 14b is moved in the direction of the arrow f", the drill 46, which of course, rotates with the carrier support member 14b is operative to drill an aperture 58a in the end of the workpiece W" along the axis e".

Provided in the carrier support member 14b is an axially extending, eccentric passage 16b receiving a rotary carrier drum 18b having an eccentric passage 20b therethrough in which a tool supporting stem or spindle 22b is rotatably supported. A tool T" is mounted at the free end of the stem 22b whereas the opposite end of the stem 22b mounts a gear 23b in intermeshing relation with an idler gear 24b. The gear 24b is fixed to a stem 25b journaled in the end face of the rotary carrier 18b, and is in intermeshing relation with an elongated gear 26b fixed to the end wall 15b of the support member 14b. Bores 15 and 66 are provided in the end wall 15b and the gear 26b. A cylindrical bore 27b is provided in the one end wall of the carrier 18b for receiving the elongated gear 26b as the carrier 18b is moved axially inwardly in a manner which will be described more fully hereinafter. The operative working relationship of the gears 23b, 24b and 26b is the same as the relation and operation of the gears 23, 24 and 26.

The apparatus for rotating the drum carrier 18b includes a sleeve 60 slidably mounted on the reduced diameter portion 48 and having a circumferential flange 62 mounting an axially extending draw bar 64 which passes through the axially aligned bores 15", 66, and 27b in the wall 15b, the gear 26b, and the carrier 18b respectively. The draw bar 64 is connected to the carrier 18b at the inner end wall of the bore 27b. A pair of compression springs 70 react between the wall 50 and the flange 62 for normally biasing the sleeve 60 to the forward position, as illustrated in FIG. 5. A double acting, solenoid actuated, fluid operated cylinder 72 is fixed to the carrier support member 14b and includes a piston 73 connected with a reaction plate 74 which is supported on the frame 62.

For rotating the carrier drum 18b as it is moved axially relative to the support member 14b by the cylinder 72, a cam follower pin 74 is fixed to the carrier 14b and is received in a cam track 42b cut in the outer wall of the carrier 18b. The pin reacts with the side walls of the track 42b to force the carrier drum in a rotary path of travel.

In the operation of the embodiment illustrated in FIG. 5, the motor 19b is driven to rotate the support member 14b and drill 46 about the workpiece axis e". The rotary drum carrier member 18b, carried by the support member 14b, also orbits about the axis e" as the carrier 14b is rotated by the motor 19b. As the frame F" moves axially towards the workpiece W"', in the direction of the arrow f", the drill 46 cuts an aperture 58 in the workpiece W". At the same time the bore 58 is drilled to the predetermined depth, the cylinder 72 is actuated to interrupt further axial movement of the sleeve 60 in the direction of the arrow f" relative to the carrier 14b. The draw bar 64 is thus drawn in the direction of the arrow g" relative to the support member 14b to move the rotary carrier 18b axially inwardly relative to the carrier support member 14b against the force of springs 70. As the sleeve 60 moves axially relative to the carrier support member 14b, the camming pin 74 rides in the track 42b and forces the rotary carrier 18b about its axis. As the carrier 18b rotates in one direction, the gear 23b reacts with the gears 24b and 26b to rotate the tool T' in the opposite direction to cut an annular circumferential slot or notch 76 in the workpiece W"'.

The rotation of the tool T" is such that the circumferential orientation of the tool T" and a radial line intersecting the workpiece axis e" and any given point on the cutting tool T" remains constant as the cutting tool T" moves in said annular path.

In the embodiment illustrated in FIG. 6, an electric motor 19c and a rotary carrier support member 14c are fixed to the frame F"' which may suitably comprise a cross slide of the type mentioned. The carrier support member 14c includes a bore 32c receiving a shaft 34c mounting a chuck or collet 44c at its outer end for clamping or chucking bar stock W"". The drive shaft 34c is fixed to the output shaft 13c of the motor 19c for rotation at a relatively high velocity.

The carrier 14c includes an eccentric passage 16c rotatably receiving a rotary drum carrier 18c having an eccentric passage 20c therein receiving a tool supporting stem 22c. The free end of the tool stem 22c mounts a facing or forming tool T"', and a gear 23c is fixed to the opposite end of the stem 22c. The gear 23c is intermeshed with an idler gear 24c journaled in the end wall of the support member 18c and is intermeshed with a gear 26c fixed to the end wall 14c of the support member 18c.

The drum carrier 18c is rotated about its axis by a shaft 64c passing through a bore 66c in the annular gear 26c and fixed to an end wall of the carrier 18c. The shaft 64c includes an enlarged diameter portion 80 journaled in the wall 81 of the support member 14c. The shaft 64c is driven by a drive train comprising a gear 82 fixed to the shaft 64c and in intermeshing relation with an idler gear 83, freely rotated on the shaft 34c, the gear 83 is fixed to an enlarged gear 84 which is journaled on the shaft 34c and is in intermeshing relation with a gear 85 journaled on the shaft portion 80. The gear 85 is fixed to an enlarged gear 86 which is in intermeshing relation with a reduced diameter gear 87 supported on the shaft 34c. The gear 87 is fixed to an enlarged gear 88 which is in intermeshing relation with a reduced gear 89 that is fixed to an idler shaft 90 which is journaled in a bearing block 91 mounted on the support member 14c. Also fixed to the opposite end of the shaft 91 is an enlarged sprocket 92 which is in intermeshing relation with the gear 93 fixed to the output shaft 13c of the motor 19c.

In operation of the embodiment illustrated in FIG. 6, the motor 19c operates to drive the shaft 13c and the workpiece W''' about the workpiece axis e'''. The gear train 82–93 simultaneously drives or rotates the carrier 18c about its axis in a first direction. The stem 22c, which is carried by the carrier 18c in an annular path, is rotated by the gears 23c, 24c, and 26c in an opposite direction to move the facing tool T''' into engagement with the circumferential surface of the workpiece W''' in such a manner that the circumferential orientation of the tool and a radial line intersecting the axis e''' and any given point on the facing tool T remains constant as the tool moves in an annular path.

Referring now to the embodiment illustrated in FIG. 7, a carrier support member 14d is stationarily mounted on a cross slide (not shown) and includes a bore 16d therein for receiving a rotary carrier 18d. An eccentric passage 20d is provided in the carrier 18d and receives a stem 22d mounting a tool T'''' as described hereinbefore. A drum driving stem 64d is fixed to the drum 18d for rotating it about its axis through a series of gears schematically illustrated at 23d, 24d and 26d which are mounted and operate in a manner identical to the gears 23, 24 and 26 respectively. The shaft 64d is rotated about its axis by means of a pinion gear 94 which is in intermeshing relation with a worm gear 95 fixed to a shaft 96 which is journaled for rotation in the support member 14d. The worm gear shaft 96 includes a gear 97 fixed thereto and in intermeshing relation with a rack gear 98 which is fixed to a reciprocable draw bar 99 reciprocated in the directions of the arrows h and i, by apparatus not shown.

In operation of the apparatus illustrated in FIG. 7, the rotary carrier 18d is rotated about its axis in a to-and-fro arcuate path as the rack 98 is reciprocated in a to-and-fro path in the directions of the arrows h and i. The workpiece is moved adjacent to the tool T'''' when the tool is swinging in one direction and then removed when the tool T'''' is moving in the opposite direction so that another workpiece can be substituted in place of the finished workpiece.

While each of the various embodiments are illustrated as including only one rotary tool holder, it should be understood that each embodiment could include a plurality of circumferentially spaced tool holders mounting a plurality of tools which move in the same orbital path of travel.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Apparatus for turning a workpiece comprising: rotary support means for supporting a workpiece having a longitudinal axis;
a rotatable tool holding spindle for holding a workpiece turning tool;
a rotary support head supporting said spindle for movement therewith in an orbital path of travel and for rotation about its own axis relative to said support head when said support head is rotated;
means for rotating said support head to move said tool holding spindle in said orbital path and move said tool into turning engagement with said workpiece; and
means for rotating said tool holding spindle about its axis as said spindle moves in said orbital path in such a manner that the relative circumferential positions of said tool holding spindle and a radial line intersecting said workpiece axis and any given point on said tool holding spindle remains substantially the same as the workpiece is turned.

2. Machining apparatus comprising:
means for supporting a workpiece to be machined at a work station;
means for machining said workpiece including tool means, and means mounting said tool means for movement in an orbital path of travel about the axis of said workpiece, toward and away from the axis of said workpiece, and for rotation about its own axis during said orbital movement, said workpiece being in cutting engagement with said workpiece along a cutting radius to machine said workpiece during a portion of movement in said orbital path;
means mounting one of said tool means and said workpiece support means for rotation about the workpiece axis; and
means for rotating said tool means about its own axis as it moves in said orbital path so that the circumferential orientation of said tool means relative to said cutting radius remains constant when said tool means is in cutting engagement with said workpiece.

3. Machining apparatus comprising:
means for supporting a workpiece to be machined at a work station;
rotary cutting tool means for cutting said workpiece at said work station;
means mounting said support means and said rotary cutting tool means for relative movement and including means mounting at least one of said support means and said cutting tool means for rotation about the axis of said workpiece and mounting said cutting tool means for movement in an endless path;
means for rotating said one of said cutting tool means and said support means about the axis of said workpiece while moving said cutting tool means in said endless path; and means for rotating said cutting tool means about its own axis to move the cutting tool means toward and away from the workpiece axis to cut the workpiece, as said cutting tool means moves in said endless path, said cutting tool means rotating in such a manner that the radial orientation of said tool means and said workpiece axis remains constant as said cutting tool means cuts said workpiece.

4. Machining apparatus comprising:

means for supporting a workpiece to be machined at a work station;

swingable cutting tool means including a cutting edge for turning said workpiece at said work station;

means mounting said support means and said swingable cutting tool means for relative movement including means mounting at least one of said support means and said cutting tool means for rotation about the axis of said workpiece and mounting said cutting tool for movement in an endless path;

means for rotating said one of said cutting tool means and said support means about the axis of said workpiece while moving said cutting tool means in said endless path; and means for swinging said cutting tool means, as said cutting tool means moves in said endless path, about an axis spaced from the workpiece axis, and in such a path that the relative circumferential positions of said cutting means and a radial line intersecting the workpiece axis and any given point on the cutting edge remains the same as said cutting tool means turns said workpiece.

5. Machining apparatus comprising:

a frame;

workpiece support means on said frame for supporting a workpiece at a work station; and means for machining said workpiece to form an arcuate surface thereon about a longitudinal axis of said workpiece, said machining means including rotary cutter means for cutting said workpiece mounted on said frame;

a carrier, mounted for rotation on said frame, mounting said cutter means for movement therewith in at least a portion of an orbital path of travel toward and away from the axis of the workpiece and for rotary movement relative thereto as said cutter means moves in said portion of said orbital path to engage and cut said workpiece; and means mounting one of said workpiece support means and said cutter means for rotation relative to the other;

means for rotating said one of said workpiece support means and said cutter means including means for revolving said rotary carrier about its axis to move said cutter means in said orbital path, and means for rotating said cutter means on said carrier as it moves in said orbital path of travel with said carrier to engage said workpiece and cut said arcuate surface.

6. The apparatus set forth in claim 5 including means for maintaining the angle between said cutter means and a plane perpendicular to the workpiece surface portion being cut constant.

7. Apparatus for machining a workpiece comprising:

a frame;

workpiece support means on said frame for supporting a workpiece at a work station;

rotary cutting tool means for cutting said workpiece at said work station;

means mounting at least one of said support means and said rotary cutting tool means for rotation relative to the other about the axis of said workpiece; and means mounting said cutting tool means for movement in at least a portion of an orbital path of travel and for concurrent rotation about its axis as it moves in said orbital path while maintaining a constant angle between said cutting means and a plane perpendicular to the workpiece surface portion being cut.

8. The apparatus as set forth in claim 5 where said carrier means comprises rotary cylinder means having an eccentric bore rotatably receiving said rotary cutter means, and said means for rotating said cutter means includes rotatable means reacting between said cylinder means and said cutter means.

9. The apparatus of claim 5 wherein said cutter means is movable between workpiece engaging and non-engaging positions as it is moved toward and away from, respectively, said workpiece axis.

10. The apparatus of claim 5 wherein said means for machining an arcuate surface comprises means for turning a diameter on said workpiece.

11. The apparatus of claim 5 wherein said means for machining an arcuate surface comprises means for cutting a cylindrical surface about the axis of said workpiece.

12. The apparatus of claim 5 wherein said cutter means is revolved about its own axis in such a manner that the radial orientation of said cutter means relative to said workpiece axis remains constant as said cutter means moves in said orbital path.

13. The apparatus of claim 5 wherein the cutter means is revolved about its own axis in such a manner that the orientation of said cutter means relative to a radial line intersecting the workpiece axis and any given point on said cutter means remains the same as said cutter means moves in said orbital path and cuts said workpiece.

14. The apparatus as set forth in claim 5 wherein said rotary carrier and said cutter means rotate about their respective axes in opposite directions as said cutter means moves in said orbital path to swing said cutter means into and out of cutting engagement with said workpiece.

15. The apparatus as set forth in claim 5 wherein said means for relatively rotating said workpiece support means and said cutter means includes means for rotating said workpiece about its axis.

16. The apparatus of claim 5 wherein said rotary carrier is mounted for rotation about the axis of said workpiece.

17. The apparatus as set forth in claim 16 wherein said means for relatively rotating said workpiece support means and said cutter means includes translatable means movable in an axial path toward and away from said support means; means mounting said rotary carrier on said translatable means for movement therewith in said axial path; and means for interrupting the axial movement of said rotary carrier in said axial path to drive said carrier in said orbital path.

18. The apparatus as set forth in claim 23 including a carrier support member movable axially toward and away from said workpiece support means and supporting said carrier for rotary movement thereon; means for relatively axially moving said carrier support member and said workpiece support means axially toward and away from each other; and means responsive to axial movement of said rotary carrier toward said workpiece support means to rotate said rotary carrier in an annular path and move said cutter means into cutting engagement with the workpiece.

19. The apparatus set forth in claim 18 wherein said responsive means includes actuator means mounted on said carrier support member for movement axially therewith and for rotary movement relative thereto; means for interrupting the axial movement of said actuator means; said actuator means and rotary carrier including cooperating cam means and cam follower means for rotating said rotary carrier when the axial movement of said actuator means is interrupted.

20. The apparatus set forth in claim 19 wherein said rotary carrier is mounted on said carrier support member for movement axially therewith and axially relative thereto when axial movement of said actuator is interrupted.

21. The apparatus set forth in claim 20 including additional cutter means mounted on said rotary carrier support member for axial movement therewith for cutting said workpiece as said carrier support member and said workpiece support member are moved axially toward each other.

22. The apparatus set forth in claim 19 wherein said actuator means comprises an axially extending bar; and wherein said cam comprises a cam track in the surface of said rotary carrier and said cam follower comprises means on said bar and received in said track.

23. The apparatus set forth in claim 5 including a carrier support member supporting said carrier thereon for rotary movement about its own axis; said means for relatively rotating said cutter means and said support means comprises means for rotating said carrier about its own axis on said carrier support members.

24. The apparatus set forth in claim 23 wherein said workpiece support means is rotatably mounted on said carrier support member; and means coupled with the carrier revolving means for driving said workpiece support member.

25. The apparatus set forth in claim 23 wherein said means for relatively rotating said carrier and said workpiece support means comprises means mounted on said carrier support member and coupled with said carrier for translating linear motion into rotary motion for rotating said carrier in a reciprocatory path.

* * * * *